United States Patent
Wu

(10) Patent No.: US 9,454,467 B2
(45) Date of Patent: Sep. 27, 2016

(54) METHOD AND APPARATUS FOR MINING TEST COVERAGE DATA

(71) Applicant: Tencent Technology (Shenzhen) Company Limited, Shenzhen (CN)

(72) Inventor: Yunjia Wu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/458,127

(22) Filed: Aug. 12, 2014

(65) Prior Publication Data
US 2015/0169435 A1    Jun. 18, 2015

Related U.S. Application Data

(63) Continuation of application No. PCT/CN2014/079669, filed on Jun. 11, 2014.

(30) Foreign Application Priority Data

Dec. 12, 2013  (CN) .......................... 2013 1 0676501

(51) Int. Cl.
*G06F 9/44*       (2006.01)
*G06F 11/36*      (2006.01)

(52) U.S. Cl.
CPC ....... *G06F 11/3684* (2013.01); *G06F 11/3676* (2013.01)

(58) Field of Classification Search
None
See application file for complete search history.

(56) References Cited

U.S. PATENT DOCUMENTS

| | | | |
|---|---|---|---|
| 5,729,676 A * | 3/1998 | Inoue | G06F 8/20 712/206 |
| 5,737,609 A * | 4/1998 | Reed | G06F 11/3684 714/E11.208 |
| 5,933,640 A * | 8/1999 | Dion | G06F 8/433 714/E11.209 |

(Continued)

FOREIGN PATENT DOCUMENTS

| CN | 102426551 A | 4/2012 |
|---|---|---|
| CN | 103246602 A | 8/2013 |

OTHER PUBLICATIONS

Baluda, et al., "Structural coverage of feasible code"; 2010 ACM; [retrieved on Jun. 23, 2016]; Retrieved from Internet <URL:http://dl.acm.org/citation.cfm?id=1808275>;pp. 59-66.*

(Continued)

*Primary Examiner* — Xi D Chen
(74) *Attorney, Agent, or Firm* — Morgan, Lewis & Bockius LLP

(57) ABSTRACT

A method of mining test coverage data includes: at a device having one or more processors and memory: sequentially processing each of a plurality of coverage data files that is generated by executing the program using a respective test input of a plurality of test inputs, where the processing of each current coverage data file extracts respective execution counter data from the current coverage data file; after processing each current coverage data file, determining whether the respective execution counter data extracted from the current coverage data file includes a predetermined change relative to the respective execution counter data extracted from previously processed coverage data files; and in response to detecting the predetermined change for the current coverage data file, including the respective test input used to generate the current coverage data file in a test input collection for testing the program.

17 Claims, 5 Drawing Sheets

(56) References Cited

U.S. PATENT DOCUMENTS

| | | | | |
|---|---|---|---|---|
| 6,002,869 | A * | 12/1999 | Hinckley | G06F 11/3696 714/35 |
| 6,959,431 | B1 * | 10/2005 | Shiels | G06F 11/3676 717/124 |
| 6,978,401 | B2 * | 12/2005 | Avvari | G06F 11/3676 714/38.13 |
| 7,028,290 | B2 * | 4/2006 | Srivastava | G06F 11/3676 712/227 |
| 7,080,358 | B2 * | 7/2006 | Kuzmin | G06F 11/3676 717/127 |
| 7,203,882 | B2 * | 4/2007 | Fine | G01B 31/31837 714/724 |
| 7,272,752 | B2 * | 9/2007 | Farchi | G06F 11/3676 714/37 |
| 7,353,500 | B2 * | 4/2008 | Ioku | G06F 11/3676 712/227 |
| 7,421,684 | B2 * | 9/2008 | Dimpsey | G06F 11/3476 717/131 |
| 7,444,622 | B2 * | 10/2008 | Grieskamp | G06F 11/3684 714/E11.207 |
| 7,480,899 | B2 * | 1/2009 | Dimpsey | G06F 11/3676 717/127 |
| 7,523,445 | B1 * | 4/2009 | Geller | G06F 17/11 706/19 |
| 8,079,018 | B2 * | 12/2011 | Huene | G06F 8/75 717/131 |
| 8,108,826 | B2 * | 1/2012 | Li | G06F 11/3676 717/106 |
| 8,171,457 | B2 * | 5/2012 | Dimpsey | G06F 11/3476 717/127 |
| 8,196,113 | B2 * | 6/2012 | Miller | G06F 11/3684 717/104 |
| 8,225,288 | B2 * | 7/2012 | Miller | G06F 11/3672 706/11 |
| 8,302,080 | B2 * | 10/2012 | Wassermann | G06F 8/00 717/131 |
| 8,381,194 | B2 * | 2/2013 | Wang | G06F 11/3676 714/38.1 |
| 8,473,915 | B2 * | 6/2013 | Brodsky | G06F 11/3676 707/713 |
| 8,495,574 | B2 * | 7/2013 | Harding | G06F 11/3676 717/124 |
| 8,510,715 | B1 * | 8/2013 | Ormandy | G06F 11/3676 717/124 |
| 8,607,198 | B2 * | 12/2013 | Nir-Buchbinder | G06F 11/3616 717/124 |
| 8,683,442 | B2 * | 3/2014 | Peranandam | G06F 11/3684 717/124 |
| 8,707,264 | B2 * | 4/2014 | Hossain | G06F 11/3672 717/124 |
| 8,745,592 | B1 * | 6/2014 | Ormandy | G06F 11/3684 717/124 |
| 8,799,868 | B2 * | 8/2014 | Ndem | G06F 11/3676 717/127 |
| 8,978,009 | B2 * | 3/2015 | Mizrahi | G06F 11/3676 717/124 |
| 9,026,998 | B2 * | 5/2015 | Mizrahi | G06F 11/3676 717/124 |
| 2003/0110474 | A1 * | 6/2003 | Ur | G06F 11/3608 717/131 |
| 2003/0188298 | A1 | 10/2003 | Shaposhnick | |
| 2004/0025088 | A1 | 2/2004 | Avvari et al. | |
| 2004/0128584 | A1 | 7/2004 | Mandava et al. | |
| 2004/0181713 | A1 * | 9/2004 | Lambert | G06F 11/3688 714/48 |
| 2007/0006166 | A1 | 1/2007 | Daley | |
| 2011/0016356 | A1 * | 1/2011 | Artzi | G06F 11/3672 714/38.1 |
| 2012/0084759 | A1 * | 4/2012 | Candea | G06F 11/3612 717/131 |
| 2012/0167059 | A1 * | 6/2012 | Kosuda | G06F 11/3676 717/131 |
| 2013/0091492 | A1 * | 4/2013 | Mizrahi | G06F 11/368 717/124 |
| 2013/0152047 | A1 * | 6/2013 | Moorthi | G06F 11/368 717/124 |

OTHER PUBLICATIONS

Ball, "The Concept of Dynamic Analysis"; 7th ACM SIGSOFT international symposium on Foundations of software engineering; [retrieved on Jun. 23, 2016]; Retrieved from Internet <URL:http://dl.acm.org/citation.cfm?id=318944>;pp. 216-234.*

Jiang, Chan, "Bypassing Code Coverage Approximation Limitations via Effective Input-Based Randomized Test Case Prioritization"; 2013 IEEE; [retrieved on Jun. 23, 2016]; Retrieved from Internet <http://ieeexplore.ieee.org/stamp/stamp.jsp?tp=&arnumber=6649820>;pp. 190-199.*

Farhat, "A Beta Model for Estimating the Testability and Coverage Distributions of a VLSI Circuit"; 1993 IEEE; [retrieved on Jun. 23, 2016]; Retrieved from Internet <http://ieeexplore.ieee.org/stamp/stamp.jsp?tp=&arnumber=229738>;pp. 550-554.*

Tencent Technology, ISR, PCT/CN2014/079669, Sep. 23, 2014, 3 pgs.

* cited by examiner

METHOD AND APPARATUS FOR MINING TEST COVERAGE DATA

PRIORITY CLAIM AND RELATED APPLICATION

This application is a continuation application of PCT Patent Application No. PCT/CN2014/079669, entitled "METHOD AND APPARATUS FOR MINING TEST COVERAGE DATA" filed on Jun. 11, 2014, which claims priority to Chinese Patent Application No. 201310676501.7, entitled "Method and Apparatus for Minding Data", filed on Dec. 12, 2013, both of which are incorporated by reference in their entirety.

TECHNICAL FIELD

The present disclosure relates generally to the field of data processing technology, and in particular, to method and apparatus of mining test coverage data.

BACKGROUND

In quality assurance systems (e.g., in quality assurance systems for C/C++ software development), test coverage is an important parameter for measuring completeness of the testing that has been performed. Based on the analysis of test coverage data, code blocks that have not been covered can be located quickly.

Accordingly, in testing a software program (e.g., a C/C++ software program), data mining can be performed on test coverage data so as to identify suitable test input data. In other words, a minimum set of tests can be selected according to the change of coverage rate, and used to achieve the test effect of a large amount of tests, so as to improve the efficiency of testing.

According to a conventional method of analyzing the test coverage data, total test coverage rate (e.g., a percentage) is obtained first through a summing process for each test, and changes in the total coverage rate are used to determine whether to include the current test in the minimum set of sets. The procedure for obtaining total coverage rate through summing process is very time consuming, and significantly reduces the efficiency of the coverage data mining Sometimes, when there is a large amount of test coverage data (e.g., millions of lines), the data mining can take days or more time to complete.

SUMMARY

In the present disclosure, a method and system for mining test coverage data is disclosed. The mining of test coverage data can be used to select a reduced set of representative tests for testing a program that will have a relatively complete coverage rate similar to that produced by a large number of tests. At the same time, the data mining is based on execution counter data extracted from the test coverage data files, rather than the total coverage rates obtained through a summing process. Thus, the need to completely parse the whole test coverage data file is eliminated. The efficiency of the data mining is improved.

In some embodiments, a method of mining test coverage data includes: at a device having one or more processors and memory: sequentially processing each of a plurality of coverage data files that is generated by executing the program using a respective test input of a plurality of test inputs, where the processing of each current coverage data file extracts respective execution counter data from the current coverage data file; after processing each current coverage data file, determining whether the respective execution counter data extracted from the current coverage data file includes a predetermined change relative to the respective execution counter data extracted from previously processed coverage data files; and in response to detecting the predetermined change for the current coverage data file, including the respective test input used to generate the current coverage data file in a test input collection for testing the program.

In some embodiments, an electronic device includes one or more processors; and memory storing one or more programs for execution by the one or more processors, where the one or more programs include instructions for performing the operations of the methods described herein. In some embodiments, a non-transitory computer readable storage medium stores one or more programs, the one or more programs comprising instructions, which, when executed by an electronic device with one or more processors, cause the electronic device to perform the operations of the methods described herein.

Various other advantages of the various embodiments would be apparent in light of the descriptions below.

BRIEF DESCRIPTION OF DRAWINGS

The aforementioned embodiments as well as additional embodiments will be more clearly understood in light of the following detailed description taken in conjunction with the drawings.

Like reference numerals refer to corresponding parts throughout the several views of the drawings.

DETAILED DESCRIPTION

Figure 1:
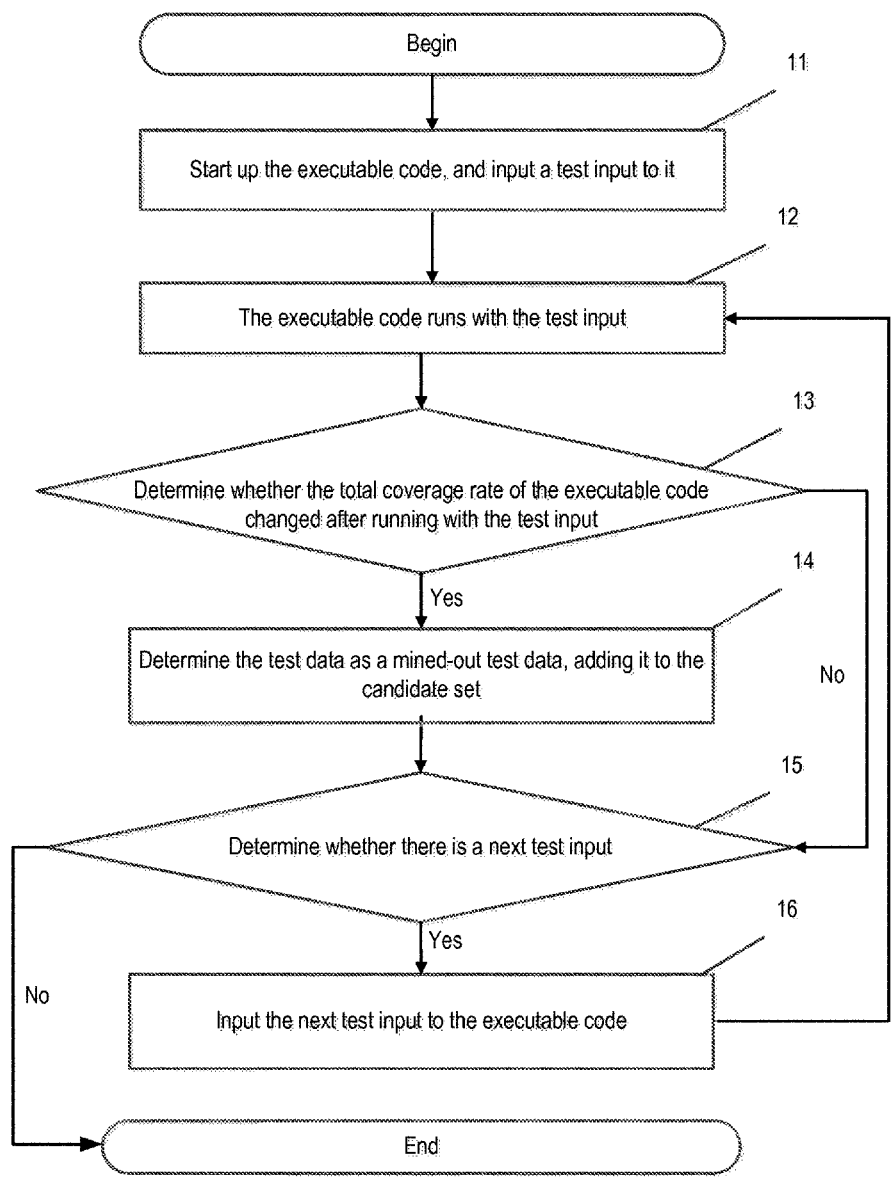
FIG. 1 is a flow chart of a conventional method of mining test coverage data.

A computer program includes executable code. Typically, the source code of a program is stored in one or more source code files, and when the source code is compiled by a compiler into executable code, the executable code is stored in one or more executable files. In general, each executable file includes many code blocks. Each of the code blocks as a unit is either executed or not executed each time the program is run (e.g., run with different input parameters). When testing a program, the source code of the program can be compiled in a way such that instrumentation can be built into the executable files, and as a result, whether a particular code block is executed during runtime may be recorded and the recorded information can be outputted as a test coverage file at the end of the program run. GNU's gcov is such a test coverage program. When gcov is used in conjunction with the gcc compiler, the performance statistics, such as how often each line of code executes, and which lines of code are actually executed, can be stored in one or more test coverage data files (e.g., a *.gcov file) produced after the program is run.

Software developers can use coverage testing in concert with test suites to make sure software is actually good enough for a release. Test suites can verify that a program works as expected; a coverage program tests to see how much of the program is exercised by the test suite. Developers can then determine what kinds of test cases need to be added to the test suites to create both better testing and a better final product.

In general, the test coverage file includes an execution count for each code block identified in the executable file(s). For each code block, an independent counter will be used to count the number of times the code block is executed. The value of the counter, i.e., the statistics result, will be written into a test coverage data file corresponding to the file in which the code block is located. The test coverage data file usually includes following information: file name, function name, line number, contained code block, value of counter corresponding to each code block and etc.

In order to identify suitable test input data to enter into the test suites for a program, such that a relative small set of tests can be run to achieve the testing effect of a large amount of tests, conventional methods of analyzing the test coverage data rely on detecting a change in a total test coverage rate (e.g., a percentage) caused by each new piece of test input data. In order to obtain such total test coverage rate, the whole test coverage data file needs to be parsed into its different components (e.g., line numbers, function names, branches, etc.) and the respective counters for these components, and then the counter values are summed according to their respective associated components. The procedure for obtaining total coverage rate through summing process is very time consuming, and significantly reduces the efficiency of the coverage data mining. Sometimes, when there is a large amount of test coverage data (e.g., millions of lines), the data mining can take days or more time to complete.

Furthermore, a third party statistics tool (e.g., lcov) is used to parse the test coverage data files, and obtain the total statistics from the test coverage data files. For example, FIG. 1 is a flow chart of a conventional method of test coverage data mining. The conventional method includes the following steps:

Step 11: Start up the executable code, and input a test input to it. The executable code here refers to the executable program that has been compiled with the test coverage instrumentation option (e.g., the gcov option).

Step 12: The executable code is run with the test input.

Step 13: Determine whether the value of the total coverage rate (usually a percentage ratio) has changed (relative to the total coverage rate of previous test runs using one or more previously used test inputs). Before determining whether there is a change in the total coverage rate, the test coverage data file is parsed completely and a summation procedure is performed (e.g., using the lcov tool) on the parsed data to obtain the total coverage rate for the current run with the current test data. If a change in the total test coverage rate has been detected, step 14 is performed; otherwise, step 15 is performed.

Step 14: Choose the test input as a selected test input and add it to a candidate test set (e.g., for a test suite), and then perform step 15.

Step 15: Determine whether there is a next test input, if so, then perform step 16, otherwise the flow terminates.

Step 16: Input the next test input to the executable code, and perform step 12 again.

As set forth above, the executable code usually includes a plurality of files, and each file corresponds to a respective test coverage data file for recording information related to the coverage of the file. In practical applications, the test coverage data file may be generated, updated, and parsed using a gcov tool. For example, if the coverage information of a file is changed by running the executable code with a new test input, the test coverage data file corresponding to the executable is updated. Typically, the test coverage information (e.g., statistics) in the test coverage data file is cumulative throughout multiple test runs.

Since the gcov tool doesn't support a statistics function, a third party tool such as the lcov tool is needed when total coverage information is needed. Particularly, each test coverage data file is fully parsed by the gcov tool. That means the whole information in each test coverage data file will be parsed out into components and their respective counter values. Thereafter, the results of the parsing may be summarized according to components through calling the lcov tool, thereby obtaining required total coverage rate in the end. The procedure for obtaining the total coverage rate through summarizing takes a long time, which reduces the efficiency of data mining severely.

Based on the foregoing introduction, the present application provides an improved method of data mining, by which the efficiency of data mining can be improved.

Figure 2:
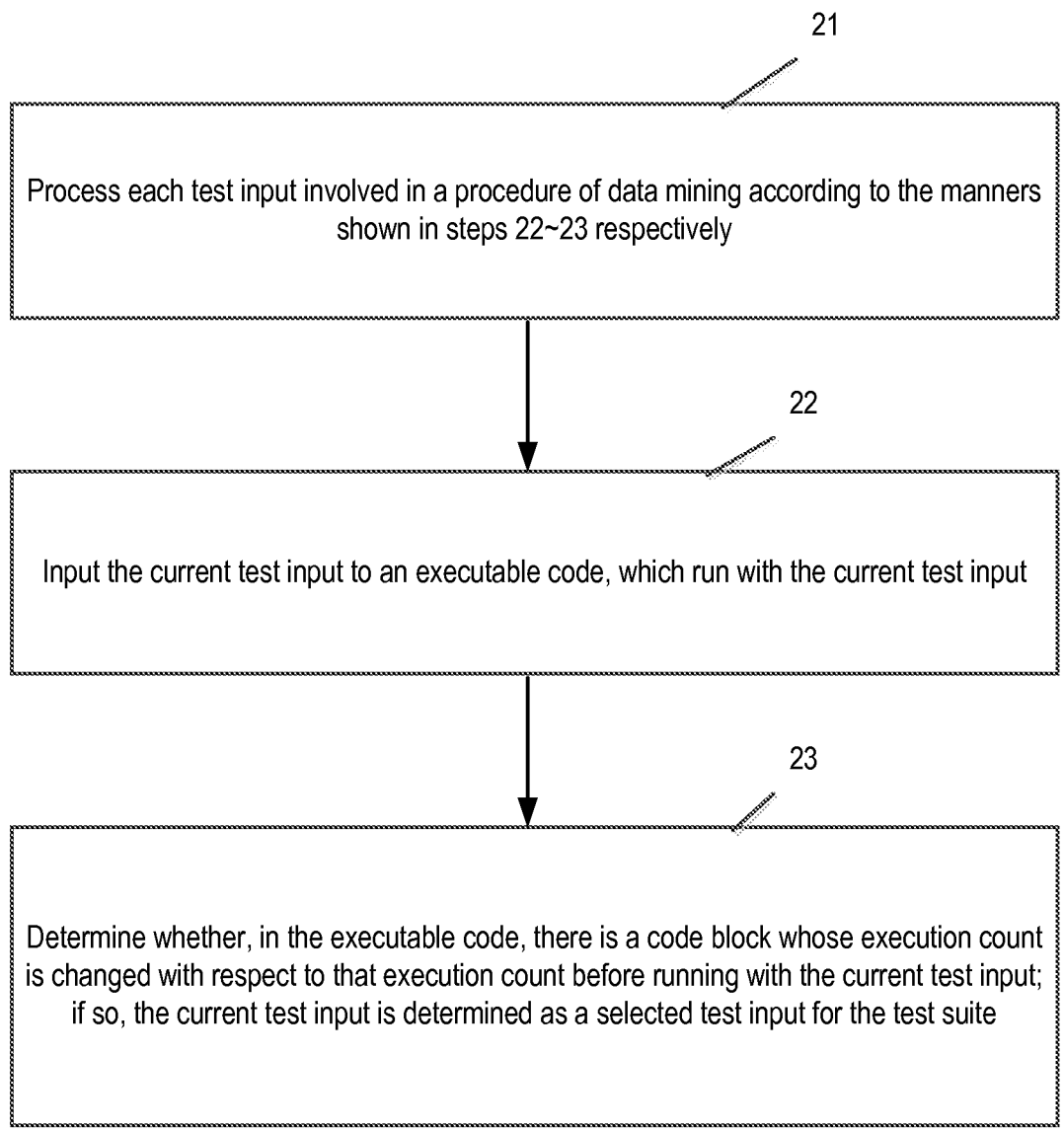
FIG. 2 is a flow chart of a method of mining test coverage data in accordance with some embodiments.

FIG. 2 is a flow chart of a method of mining test coverage data in accordance with some embodiments. As shown in FIG. 2, the method includes the following steps:

Step 21: Process each test input involved in a procedure of data mining according to the manners shown in steps 22~23 respectively. Each test input includes a respective combination of all variable test parameters (e.g., input values, configuration values, etc.) for the program. In general, a pool of test inputs are available for use, and a reduced set of test inputs are selected in the end to provide a full test coverage of the program.

Step 22: Input the current test input to an executable code, which run with the current test input. In practical applications, before processing each test input according to the manners shown in steps 22~23, the executable code need to be started up with instrumentation. In other words, before inputting a first test input to the executable code, the executable code needs to be instrumented first to be able to produce the test coverage data. The executable code here refers to the executable program that has been compiled to provide coverage data. Executing an executable code with the current test input, and generating or updating relevant test coverage data file(s) can be done using conventional methods, such as using the GNU compilers, execution environment, and the gcov tools.

Step 23: Determine whether, in the executable code, there is a code block whose execution count is changed with respect to that execution count before running with the current test input. If so, the current test input will be selected as a selected test input for the test suite of the program. During data mining, only the value of counters in the test coverage data file need to be considered, while the function name, line number and other information can be ignored. Thus, the other information does not need to be parsed completely and/or summed. For example, in some embodiments, if the cumulative execution counter for a particular code block is x (e.g., 5) after the execution using the previous test inputs, and the cumulative counter for the same code block has changed to y (e.g., 8) after the execution using the current test input, then there is a change in the execution count for the test block. For another example, in some embodiments, if the cumulative execution counter for a particular code block is zero (0) after the execution using the previous test inputs, and the cumulative counter for the same code block has changed to a non-zero value (e.g., 8) after the execution using the current test input, then there is a change in the execution count for the code block. However, in such embodiments, if the cumulative execution counter for a particular code block is already a non-zero value (e.g., 2) after the execution using the previous test inputs, and the cumulative counter for the same code block is another non-zero value (e.g., 8) after the execution using the current test input, then this change between non-zero counter values for the code block is not qualified as a change in the execution count for the code block in such embodiments. Other qualified changes can be defined and required in different embodiments, for the current test input to be selected and added to the test suite.

In some embodiments, step 23 includes:

1) Obtain the test coverage data file(s) corresponding to the executable code;

2) Parse out the respective value of the execution counter corresponding to each code block in the executable code from each obtained test coverage data file.

3) Determine whether, in the parsed-out counter values, there is a change in the counter values before and after the program is run using the current test input; if so, determine, among the code blocks of the executable code, the code blocks whose execution counts have changed, and determine the current test input as a selected test input and save it in the candidate test set for the test suite.

In some embodiments, before inputting the first test input to the executable code, a global counter value list (e.g., in the form of an execution counter table) may be generated first. The global counter value list includes a plurality of (e.g., M) counter values that are set to zero (0), respectively, wherein M is the number of code blocks included in the executable code. Each of the M counters is associated with a respective code block among the code blocks in the executable code.

In some embodiments, after step 2), a current counter value list is generated based on the parsed-out counter values obtained from the test coverage data file. Each of the parsed-out counter values is the current execution count (e.g., the cumulative execution count for all the program runs performed so far) for a respective code block among the code blocks in the executable code.

In some embodiments, after step 3), the current counter value list is used as the global counter value list. That means replacing the current version of the global counter value list with the current counter value list to obtain a new version of the global counter value list.

In some embodiments, step 3) includes: determining whether the current counter value list has changed with respect to the global counter value list; and if so, then determining, from among the parsed-out counter values, the particular counter values that have changed.

In some embodiments, a change in count value refers to: a change from 0 to a positive integer. The value of the positive integer may be 1 typically, but may also be larger than 1. For example, if the current test input causes execution of a loop operation in the executable code, the value of the positive integer may be larger than 1 (e.g., equal to the number of times the loop is executed).

Figure 3:
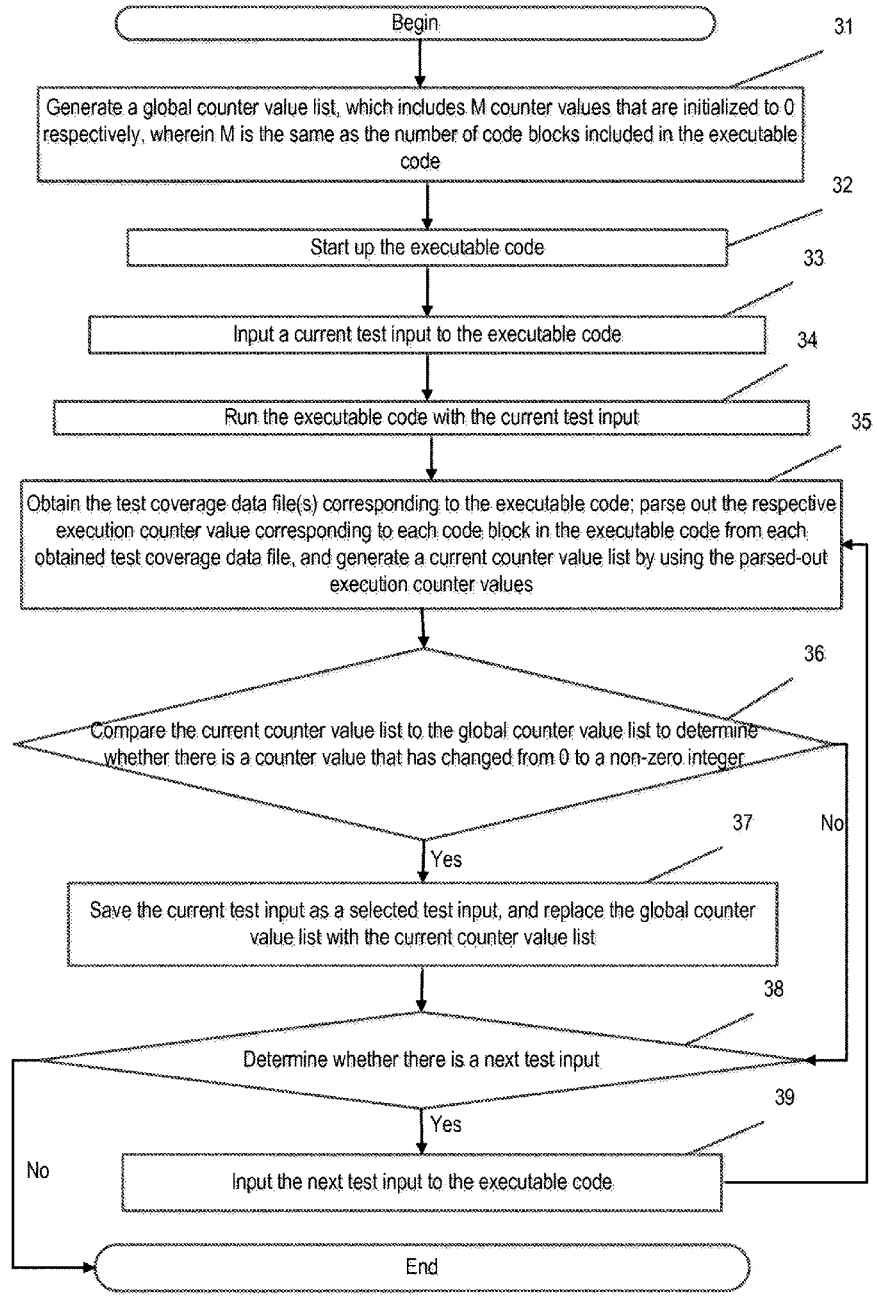
FIG. 3 is a flow chart of the method of mining data coverage data in accordance with some embodiments.

FIG. 3 is a flow chart of the method of mining test coverage data in accordance with some preferred embodiments. As shown in FIG. 3, the method includes following steps:

Step 31: Generate a global counter value list, which includes M counter values that are initialized to 0, respectively, wherein M is the same as the number of code blocks included in the executable code.

Step 32: Start up the executable code;

Step 33: Input a current test input to the executable code;

Step 34: Run the executable code with the current test input;

Step 35: Obtain the test coverage data file(s) corresponding to the executable code; parse out the respective execution counter value corresponding to each code block in the executable code from each obtained test coverage data file, and generate a current counter value list by using the parsed-out execution counter values;

Step 36: Compare the current counter value list to the global counter value list, determine whether there is a counter value that has changed from 0 to a non-zero integer; if so, perform step 37; otherwise, perform step 38. For example, suppose that the current counter value list includes 5 counter values for 5 different code blocks, which are 0, 0, 1, 1, and 0, respectively. Further suppose that the global counter value list also includes 5 counter values, which are 0, 0, 0, 1, and 0, respectively. By a comparison of both, it is determined that there is a counter value changed from 0 to 1 (e.g., the counter value for the third code block) in the current counter value list, so that step 37 is performed subsequently.

Step 37: Save the current test data as a selected test input, and replace the global counter value list with the current counter value list; and perform step 38 thereafter;

Step 38: determine whether there is a next test input; if so, then perform step 39; otherwise, the flow ends;

Step 39: input the next test input to the executable code, and perform step 34 again.

In some embodiments, the process further includes before step 38 whether execution counter values for all of the code blocks are non-zero (i.e., all code blocks have been executed after the program is run with the previous test inputs). If so, proceed to step 38; otherwise, the flow ends regardless of whether there is a next test input.

Figure 4:
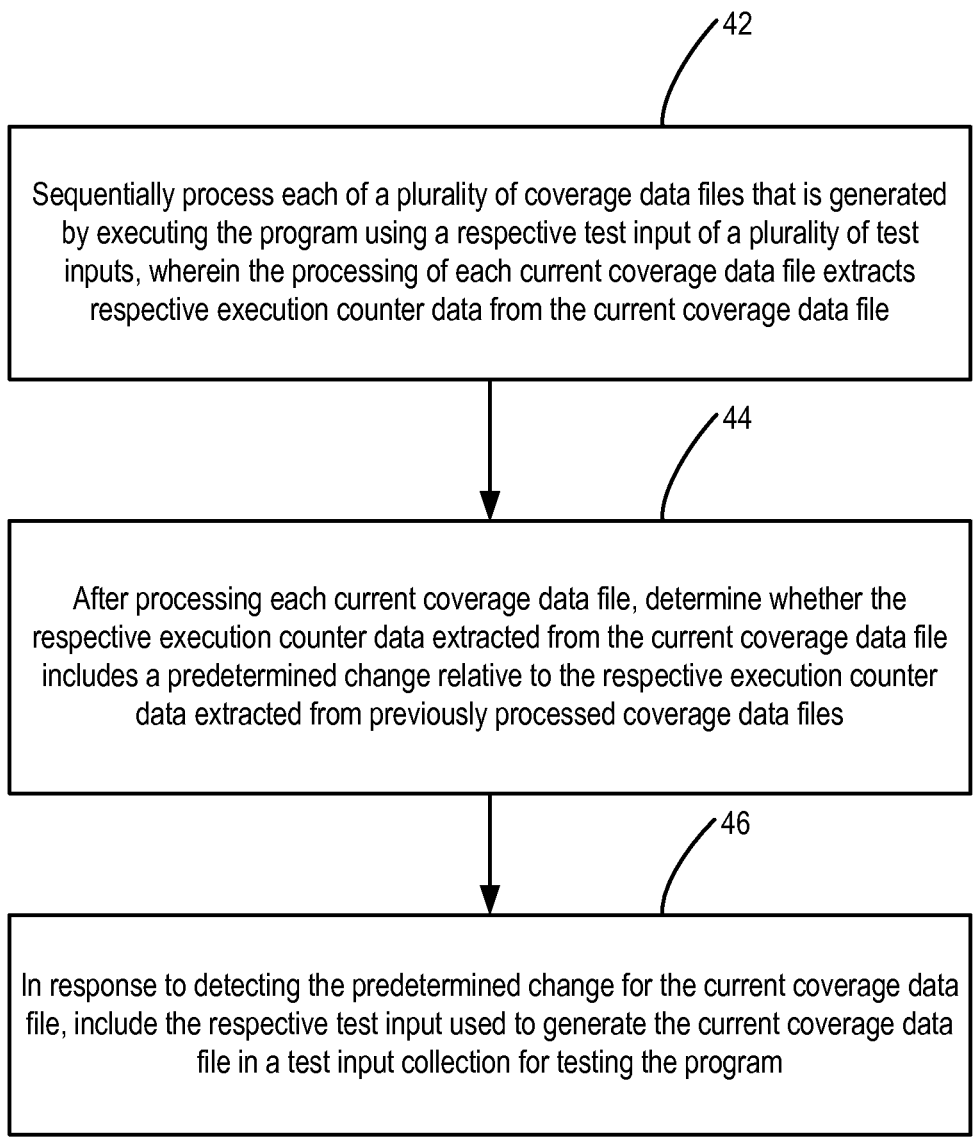
FIG. 4 is a flow chart of the method of mining data coverage data in accordance with some embodiments.

FIG. 4 is the flow chart of a method for mining test coverage data in accordance with some embodiments. The method is based on the methods described above. The method is performed by a device having one or more processors and memory, such as the device 500 and 600 shown in FIGS. 5 and 6, respectively.

As shown in FIG. 4, when mining the test coverage data, the device sequentially processes (42) each of a plurality of coverage data files (also referred to as "test coverage data files" herein) that is generated by executing the program using a respective test input of a plurality of test inputs, where the processing of each current coverage data file extracts respective execution counter data from the current coverage data file. In some embodiments, the plurality of test inputs are various test inputs that can be used to test the program. Each test input represents a respective unique combination of various parameter values, configurations, and input data for running the program. In some embodiments, the plurality of test inputs are sorted according to a particular order into a sequence of test inputs, to ensure that the most effective test inputs are included early in the sequence. In some embodiments, the processing of each test coverage data file is performed immediately after the coverage data file is generated by running the program with a current test input. In some embodiments, the processing of multiple test coverage data files may be performed together in a group after the multiple test coverage data files are generated by running the program with multiple test inputs in a group (e.g., in sequence). The processing of the test coverage data file does not need to be performed on the same device that executes the executable code and generates the test coverage data file in some embodiments. In some embodiments, the processing of the test coverage data file is performed on the same device that executes the executable code and generates the test coverage data file. In some embodiments, the plurality of test coverage data files are different versions of the same test coverage data file that are generated after the execution of the different test inputs. In some embodiments, the new version of the test coverage data file updates the previous version of the test coverage data file by adding the new execution counter values generated in the current run to the cumulative execution counter values stored in the previous version of the test coverage data file.

In some embodiments, after processing each current coverage data file, the device determines (44) whether the respective execution counter data extracted from the current coverage data file includes a predetermined change relative to the respective execution counter data extracted from previously processed coverage data files. In some embodiments, determining whether the respective execution counter data extracted from the current coverage data file includes a predetermined change relative to the respective execution counter data extracted from previously processed coverage data files further includes: determining whether the respective test input used to generate the current coverage data file has caused a respective execution counter for at least one code block in the program to change. In some embodiments, determining whether the respective execution counter data extracted from the current coverage data file includes a predetermined change relative to the respective execution counter data extracted from previously processed coverage data files further includes: determining whether the respective test input used to generate the current coverage data file has caused a respective execution counter for at least one code block in the program to change from zero to a non-zero value. In some embodiments, determining whether the respective execution counter data extracted from the current coverage data file includes a predetermined change relative to the respective execution counter data extracted from previously processed coverage data files further includes: determining whether the respective test input used to generate the current coverage data file has caused respective execution counters for at least a predetermined number of code blocks (e.g., more than 10 code blocks) in the program to change from zero to a non-zero value. In some embodiments, this predetermined number is dynamically determined based on the number of test inputs remaining in the test pool. In some embodiments, if it is determined that the respective test input used to generate the current coverage data file has not caused respective execution counters for the predetermined number of code blocks (e.g., more than 10 code blocks) in the program to change from zero to a non-zero value, then the current test input is discarded, and the current coverage data file is not stored for subsequent comparison to the coverage data files for future test inputs. In some embodiments, each new version of the test coverage data file replaces the previous version(s) of the test coverage data file, and a single test coverage file includes the cumulative counter values for all previous versions of the test coverage data file. In such cases, the previously processed coverage data files is represented by the most recent version of the coverage data file that existed before the new version of the test coverage data is generated based on the current test input.

In some embodiments, in response to detecting the predetermined change for the current coverage data file, the device includes (46) the respective test input used to generate the current coverage data file in a test input collection for testing the program (e.g., a test suite for testing the program).

In some embodiments, the device sequentially executes the program using each of the plurality of test inputs to obtain a respective one of the plurality of coverage data files, where the execution of the program using each next test input in the plurality of test inputs follows the processing of the respective coverage data file obtained from executing the program using a current test input in the plurality of test inputs.

In some embodiments, the device generates an execution counter table for the program, the execution counter table including a respective execution counter for each code block of a plurality of code blocks in the program. In some embodiments, in response to detecting the predetermined change for the current coverage data file, the device updates the execution counter table to reflect the predetermined change.

In some embodiments, once the execution counter value for a particular code block has been updated to a non-zero value after program execution using a previous test input, the execution counter value for that particular code block is no longer updated, and the determination regarding whether its value has been changed is no longer performed for subsequent program runs with additional test inputs. This further reduces the processing time of the test coverage data file, and the identification of the Other details of the method are disclosed in FIGS. 1-3 and accompanying descriptions.

Figure 5:
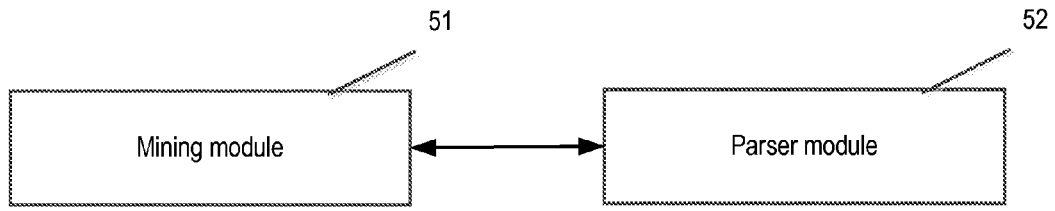
FIG. 5 is a block diagram of an apparatus for mining test coverage data in accordance with some embodiments.

FIG. 5 is a block diagram of the apparatus for mining test coverage data in accordance with some embodiments. As shown in FIG. 5, the apparatus comprises a mining module 51 and a parser module 52.

In some embodiments, the mining module 51 is used for processing each test input as following: inputting the current test input to the executable code, such that the executable code runs with the current test input; determining whether, in the executable code, there is a code block whose execution count has been changed with respect to the execution count accumulated before the program was run with the current test input; if so, the current test input is determined as a selected test input for the test suite.

Additionally, the apparatus shown in FIG. 5 may further include a parser module 52. Accordingly, the mining module 51 may further notify the parser module 42 to implement its function, after inputting the current test input to the executable code and generating or updating the test coverage data file by running the executable code using the current test input.

The parser module 52 is used for parsing out the respective counter value corresponding to each code block in the executable code from each obtained test coverage data file, and sending it to the mining module 51. The mining module 51 determines whether, in the parsed-out counter values, there is a counter value whose reading-value has changed with respect to the time before the program run with the current test input; if so, then determines that, in the code blocks of the executable code, there is at least one code block whose execution count has changed.

Also, the mining module 51 may further be used for, before inputting the first test input to the executable code, generating a global counter value list which includes M counter values that are initialized to 0 respectively, wherein M is the same as the number of code blocks included in the executable code.

The parser module 52 also may further be used for generating an current counter value list by using each parsed-out counter value, and sending it to the mining module 51. The mining module 51 also may further be used for determining whether the current counter value list includes a change with respect to the global counter value list; if so, then determining there is a counter value whose reading-value has changed in the parsed-out counter values, and replacing the global counter value list with the current counter value list.

In some embodiments, change of the reading-value include: a change from 0 to a positive integer. Also, the mining module 51 may further be used for starting up the executable code before inputting the first test input to the executable code.

The mining module 51 also may further be used for saving the current test input to a reduced candidate test set for a test suite, after determining the current test input as a selected test input for the reduced candidate test set.

Other details of the apparatus shown in FIG. 5 are disclosed with respect to FIGS. 1-4 and accompanying descriptions, and are not repeated here.

In some embodiments, the parser module 52 may be implemented as an improved gcov tool. The existing gcov tool needs to fully parse the test coverage data file, but the improved gcov tool described herein only needs to parse out the counter values in the test coverage data file, and not the other components (e.g., line number, function name, function name, etc.) in the test coverage data file.

In conclusion, each test input may be accessed to determine whether it is an effective test input for inclusion in the test suite, through determining whether it causes a qualified change in the execution count for at least one code block, after the program is run with the test input. Therefore, comparing to the prior art, the procedure in which the total coverage rate is obtained through summarizing may be omitted, thereby improving the efficiency of data mining.

Figure 6:
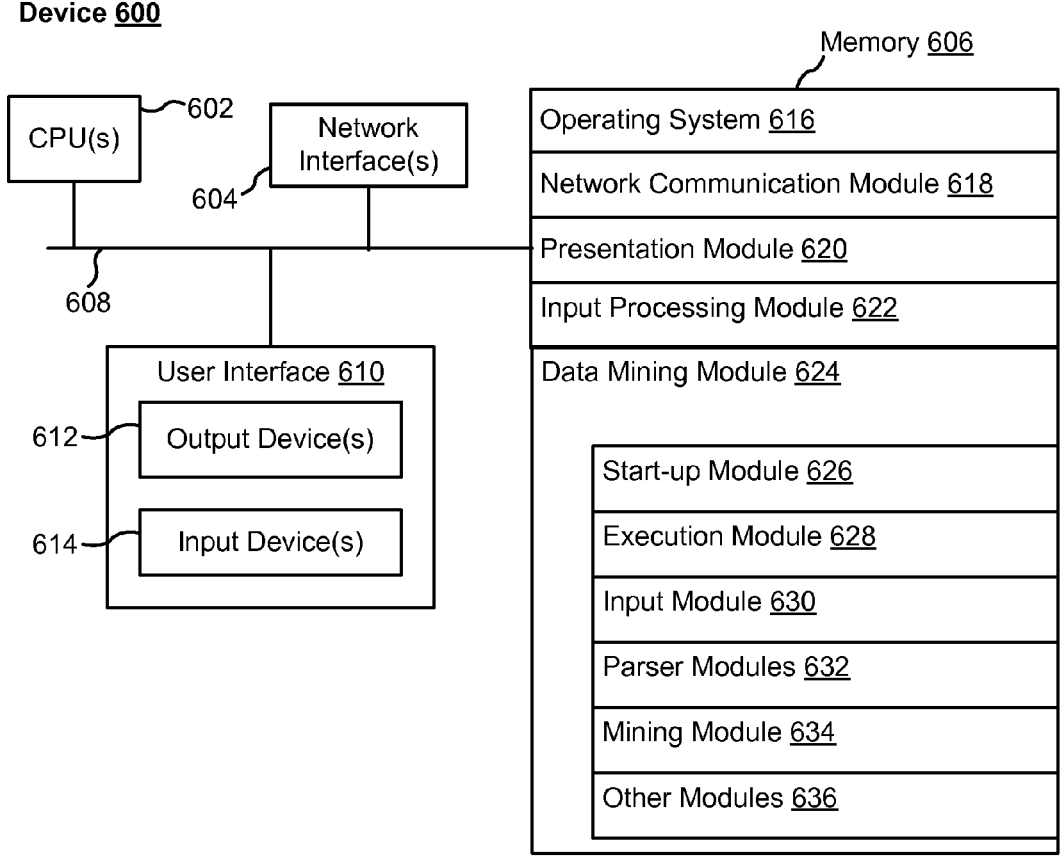
FIG. 6 is a block diagram of a device for mining test coverage data in accordance with some embodiments.

FIG. 6 is a block diagram illustrating a representative device 600 for mining test coverage data in accordance with some embodiments. Device 600, typically, includes one or more processing units (CPUs) 602, one or more network interfaces 604, memory 606, and one or more communication buses 608 for interconnecting these components (sometimes called a chipset). Device 600 also includes a user interface 610. User interface 610 includes one or more output devices 612 that enable presentation of media content, including one or more speakers and/or one or more visual displays. User interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some device 600 may use a microphone and voice recognition or a camera and gesture recognition to supplement or replace the keyboard. Memory 606 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 606, optionally, includes one or more storage devices remotely located from CPU(s) 602. Memory 606, or alternately the non-volatile memory device(s) within memory 606, includes a non-transitory computer readable storage medium. In some implementations, memory 606, or the non-transitory computer readable storage medium of memory 606, stores the following programs, modules, and data structures, or a subset or superset thereof:

- an operating system 616 including procedures for handling various basic system services and for performing hardware dependent tasks;
- a network communication module 618 for connecting device 600 to other computers connected to one or more networks via one or more communication network interfaces 604 (wired or wireless);
- a presentation module 620 for enabling presentation of information (e.g., a user interface for a web page or an application program, audio and/or video content, text, etc.) at device 600 via one or more output devices 612 (e.g., displays, speakers, etc.) associated with user interface 610;
- an input processing module 622 for detecting one or more user inputs or interactions from one of the one or more input devices 614 and interpreting the detected input or interaction; and
- an data mining module 624 for mining the test coverage data and selecting test inputs for inclusion in a test suite for a program, the data mining module 624 including:
  - a start-up module 626 for starting up an executable code with instrumentation to generate the test coverage data file when the executable is run;
  - an execution module 628 for executing the executable code with a current test input to generate a test coverage data file and/or to update an existing test coverage data file for the program;
  - an input module 630 for inputting each of the test inputs in the test input pool to the executable code;
  - a parser module 632 for extracting the execution counter data from the test coverage data file obtained after the program run using each current test input;
  - a mining module 634 for determining whether the execution counter data extracted from the test coverage data file for the current test input includes a qualified change; and if so, including the current test input in the candidate test set for the test suite for the program; and
  - other modules 636 for performing some or all of the other functions described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

While particular embodiments are described above, it will be understood it is not intended to limit the present disclosure to these particular embodiments. On the contrary, the present disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A computer-implemented method of mining test coverage data, comprising:
   at a device having one or more processors and memory:
      sequentially generating a plurality of coverage data files by executing a program using a respective test input of a plurality of test inputs, wherein the program includes a plurality of code blocks, each code block being either executed as a whole or not executed at all during the execution of the program;
      after generating the plurality of coverage data files, processing a current coverage data file by extracting respective execution counter data from the current coverage data file, wherein each code block has a counter for recording execution counter value associated with the code block and the execution counter values associated with the plurality of code blocks collectively form a counter value list;
      after processing the current coverage data file, determining whether the respective execution counter data from a current counter value list extracted from the current coverage data file includes a predetermined change relative to the respective execution counter data from a previous counter value list extracted from previously processed coverage data files, further comprising:
         determining whether the respective test input used to generate the current coverage data file has caused a respective counter for at least one code block in the program to change; and
      in response to detecting the predetermined change for the current coverage data file:
         including the respective test input used to generate the current coverage data file in a test input collection for testing the program; and
         updating the counter value list with the respective execution counter data extracted from the current coverage data file.

2. The method of claim 1, wherein determining whether the respective execution counter data extracted from the current coverage data file includes a predetermined change relative to the respective execution counter data extracted from previously processed coverage data files further comprises:
   determining whether the respective test input used to generate the current coverage data file has caused a respective execution counter for at least one code block in the program to change from zero to a non-zero value.

3. The method of claim 1, wherein determining whether the respective execution counter data extracted from the current coverage data file includes a predetermined change relative to the respective execution counter data extracted from previously processed coverage data files further comprises:
   determining whether the respective test input used to generate the current coverage data file has caused respective execution counters for at least a predetermined number of code blocks in the program to change from zero to a non-zero value.

4. The method of claim 1, wherein the execution of the program using each next test input in the plurality of test inputs follows the processing of the respective coverage data file obtained from executing the program using a current test input in the plurality of test inputs.

5. The method of claim 1, further comprising:
   generating a execution counter table for the program, the execution counter table including a respective execution counter for each code block of a plurality of code blocks in the program.

6. The method of claim 5, further comprising:
   in response to detecting the predetermined change for the current coverage data file, updating the execution counter table to reflect the predetermined change.

7. A system for mining test coverage data, comprising:
   one or more processors; and
   memory having instructions stored thereon, the instructions, when executed by the one or more processors, cause the processors to perform operations comprising:
      sequentially generating a plurality of coverage data files by executing a program using a respective test input of a plurality of test inputs, wherein the program includes a plurality of code blocks, each code block being either executed as a whole or not executed at all during the execution of the program;
      after generating the plurality of coverage data files, processing a current coverage data file by extracting respective execution counter data from the current coverage data file, wherein each code block has a counter for recording execution counter value associated with the code block and the execution counter values associated with the plurality of code blocks collectively form a counter value list;
      after processing the current coverage data file, determining whether the respective execution counter data from a current counter value list extracted from the current coverage data file includes a predetermined change relative to the respective execution counter data from a previous counter value list extracted from previously processed coverage data files, further comprising:
         determining whether the respective test input used to generate the current coverage data file has caused a respective counter for at least one code block in the program to change; and
      in response to detecting the predetermined change for the current coverage data file:

including the respective test input used to generate the current coverage data file in a test input collection for testing the program; and updating the counter value list with the respective execution counter data extracted from the current coverage data file.

8. The system of claim 7, wherein determining whether the respective execution counter data extracted from the current coverage data file includes a predetermined change relative to the respective execution counter data extracted from previously processed coverage data files further comprises:

determining whether the respective test input used to generate the current coverage data file has caused a respective execution counter for at least one code block in the program to change from zero to a non-zero value.

9. The system of claim 7, wherein determining whether the respective execution counter data extracted from the current coverage data file includes a predetermined change relative to the respective execution counter data extracted from previously processed coverage data files further comprises:

determining whether the respective test input used to generate the current coverage data file has caused respective execution counters for at least a predetermined number of code blocks in the program to change from zero to a non-zero value.

10. The system of claim 7, wherein the execution of the program using each next test input in the plurality of test inputs follows the processing of the respective coverage data file obtained from executing the program using a current test input in the plurality of test inputs.

11. The system of claim 7, wherein the operations further comprise:

generating a execution counter table for the program, the execution counter table including a respective execution counter for each code block of a plurality of code blocks in the program.

12. The system of claim 11, wherein the operations further comprise:

in response to detecting the predetermined change for the current coverage data file, updating the execution counter table to reflect the predetermined change.

13. A non-transitory computer-readable medium having instructions stored thereon, the instructions, when executed by one or more processors, cause the processors to perform operations comprising:

sequentially generating a plurality of coverage data files by executing a program using a respective test input of a plurality of test inputs, wherein the program includes a plurality of code blocks, each code block being either executed as a whole or not executed at all during the execution of the program;

after generating the plurality of coverage data files, processing a current coverage data file by extracting respective execution counter data from the current coverage data file, wherein each code block has a counter for recording execution counter value associated with the code block and the execution counter values associated with the plurality of code blocks collectively form a counter value list;

after processing the current coverage data file, determining whether the respective execution counter data from a current counter value list extracted from the current coverage data file includes a predetermined change relative to the respective execution counter data from a previous counter value list extracted from previously processed coverage data files, further comprising:

determining whether the respective test input used to generate the current coverage data file has caused a respective counter for at least one code block in the program to change; and in response to detecting the predetermined change for the current coverage data file:

including the respective test input used to generate the current coverage data file in a test input collection for testing the program; and updating the counter value list with the respective execution counter data extracted from the current coverage data file.

14. The computer-readable medium of claim 13, wherein determining whether the respective execution counter data extracted from the current coverage data file includes a predetermined change relative to the respective execution counter data extracted from previously processed coverage data files further comprises:

determining whether the respective test input used to generate the current coverage data file has caused a respective execution counter for at least one code block in the program to change from zero to a non-zero value.

15. The computer-readable medium of claim 13, wherein determining whether the respective execution counter data extracted from the current coverage data file includes a predetermined change relative to the respective execution counter data extracted from previously processed coverage data files further comprises:

determining whether the respective test input used to generate the current coverage data file has caused respective execution counters for at least a predetermined number of code blocks in the program to change from zero to a non-zero value.

16. The computer-readable medium of claim 13, wherein the execution of the program using each next test input in the plurality of test inputs follows the processing of the respective coverage data file obtained from executing the program using a current test input in the plurality of test inputs.

17. The computer-readable medium of claim 13, wherein the operations further comprise:

generating a execution counter table for the program, the execution counter table including a respective execution counter for each code block of a plurality of code blocks in the program.

* * * * *